(Model.)
M. V. B. HILL.
Machine for Feeding Cartridge Shells.
No. 233,095. Patented Oct. 12, 1880.
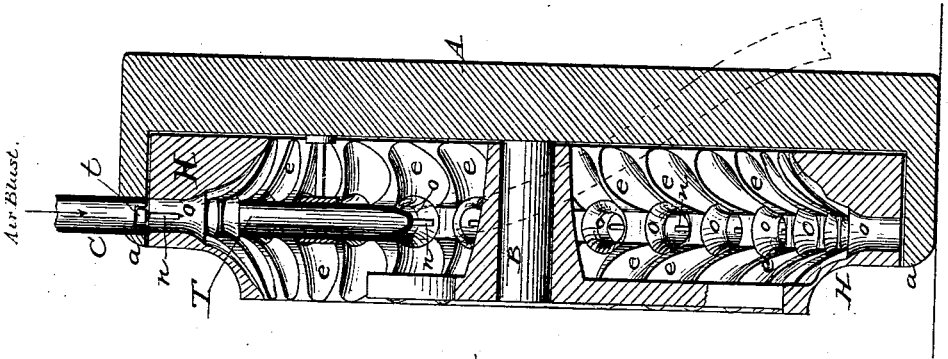
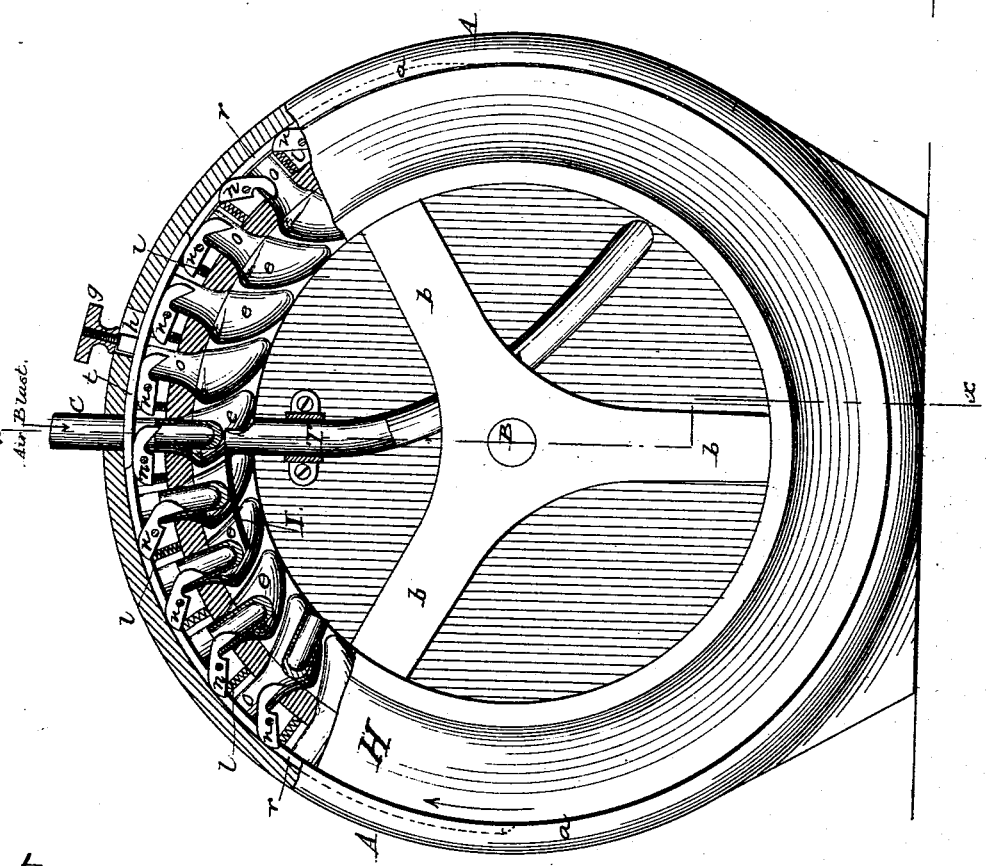
Attest:
Sidney P. Hollingsworth,
William W. Dodge.
Inventor:
M. V. B. Hill,
by Dodge & Son,
Attys.

United States Patent Office.

MARTIN V. B. HILL, OF NEW HAVEN, CONNECTICUT, ASSIGNOR TO THE WINCHESTER REPEATING ARMS COMPANY, OF SAME PLACE.

MACHINE FOR FEEDING CARTRIDGE-SHELLS.

SPECIFICATION forming part of Letters Patent No. 233,095, dated October 12, 1880.

Application filed June 7, 1880. (Model.)

*To all whom it may concern:*

Be it known that I, MARTIN VAN BUREN HILL, of New Haven, in the county of New Haven and State of Connecticut, have invented certain Improvements in Machines for Feeding Cartridge-Shells, of which the following is a specification.

My invention relates to devices for automatically feeding cartridge-shells or similar articles; and the invention consists in providing an annular rotating hopper with a series of spring-clamps arranged to operate in connection with an adjustable cam, by which means the shells are held in the cells of the hopper until carried to the proper point, and then delivered to a receiving-tube, together with certain details of construction; and it further consists in the arrangement of a tube for delivering an air-blast to the cells as they arrive opposite the receiving-tube, all as hereinafter more fully set forth.

Figure 1 is a front elevation with a portion shown in section, and Fig. 2 is a transverse vertical section on the line $x\ x$ of Fig. 1.

The object of this invention is to pick up cartridge-shells or similar articles from a mass placed or fed loosely into a hopper and deliver them uniformly, one end foremost, into a tube, through which they pass to the required place.

In the drawings, H represents a rotating hopper, which has an internal annular groove or recess, from which radiate a series of holes or cells, $o$, the sides of the recess being provided with inclined grooves $e$, to facilitate the entrance of the shells into the cells $o$. This annular hopper H is secured by three or more arms, $b$, to a central hub, which is mounted on a journal, B, projecting from the center of a case, A, which has a projecting rim that surrounds the hopper H, as represented in Figs. 1 and 2, and serves to support a cam that operates the spring-clamps, and also the tube for an air-blast.

In one side of each shell, around the periphery of the hopper, is pivoted a small clamp, $n$, in such a position that when its outer end projects beyond the periphery its inner end will press against the side of the cell, there being a small spring, $l$, arranged under the outer end of each clamp $n$, as shown in Fig. 1, to make it operate as stated. Opposite the ends of these clamps $n$ a groove, $r$, is formed on the inner face of the projecting rim $a$ of the case A, which groove extends around about one-half the circumference, as represented in Fig. 1, so that when the clamps are brought around to this groove $r$ the springs $l$ push their outer ends out into this groove, thereby throwing their inner ends inward toward the side of the cell and into the shell which may be therein, thus clamping the shell fast in the cell, as shown in Fig. 1.

In order to release the shells as they arrive opposite the receiving-tube T, I arrange in the groove $r$, at the right-hand side, a sliding cam, $t$, the stem of which projects through a slot, $h$, in the rim $a$, and has a thumb-nut, $g$, on it, for the purpose of adjusting the cam and securing it in place. As each clamp arrives opposite the mouth of the tube T its outer end strikes the cam $t$, which causes it to release its hold on the shell, which at once drops into the mouth of the tube.

In order to insure the shells leaving the cells at the proper time, and to force them into the tube, I arrange directly over the mouth of the receiving-tube another tube, C, through which an air-blast is forced by a fan or any suitable means. As the shells in this case are clamped in the cells with their open ends outward, as shown in Fig. 1, the blast of air from the tube C will enter the shell and force it out of the cell $o$ directly into the mouth of tube T very quickly.

In order to prevent a shell from being caught in the mouth of the tube while remaining partially in the cell, and to let the shells pass in case the tube is full, the mouth of the tube T is cut away on the right-hand side for a short distance, as shown in Fig. 1, and from the left-hand side of the tube, on a level with its mouth, there extends a guard-plate, I, on which the ends of the shells will rest in case they are released prematurely; and as the guard is so located that while resting on it the shells are still retained partially in the cells, it follows that they will be carried along until they come opposite the mouth of the tube, when they will drop in.

By slightly widening the mouth of the tube T and placing it the full length of a shell below the inner mouth of the cells, or a little more, the cutting away of the mouth of the tube and the guard I may both be dispensed with, especially if a strong blast be used, as in that case the shell will be thrown from the cell into the conical or enlarged mouth of the tube before it can be carried past it, and as the space between the inner end of the cell and the mouth of the tube will be equal to or a little more than the length of a shell, there will be no danger of the shell being caught between the hopper and the tube.

Another benefit of the air-blast is, that it will blow out any slivers or particles of metal or other substance that might accidentally be among the shells, and thus keep the clamps, cells, tube, &c., free from obstructions.

The receiving-tube T, as shown in Fig. 1, extends out through the casing A at any desired point within the inner circle of the hopper H, from whence it may be extended so as to convey the shells to any desired receptacle or point.

In some cases the shells are fed to machines by being placed in a tube which is attached to the machine, and which is provided with a detent that is operated by the machine at each stroke, so as to let out a single shell at a time, and which is delivered at the proper point to be operated upon by the machine. When these tubes are used they can readily be filled by simply slipping their open end onto the end of tube T, the attendant simply replacing them as fast as they are filled, when they are transferred to the machine as needed.

In other cases the tube T may be extended to deliver the shells direct to a machine or to the chute, from which they are automatically delivered in some of the machines, these varying according to the different operations to be performed in the process of making the shells.

The operation of this device is as follows: The shells are placed loosely within the rotating hopper H, which tumbles them about and works them endwise into the cells o, in which they lie until the cells arrive opposite the left-hand end of groove r, when, if they have entered with their open ends foremost, they will be clamped by the dogs or clamps n as soon as their outer ends enter the groove r. If, however, they are presented to the cells with the closed ends foremost, they will be prevented from entering by the clamps, the ends of which will strike against the closed ends of the shells; or, if they should rest in the mouth of the cell and be carried up to or past the horizontal position, they will drop out and fall back into the hopper, the clamp not being able to take hold on a shell which enters with its closed end foremost; and thus it will be seen that the apparatus selects and delivers only those shells which are presented to the cells with their open ends foremost or toward the periphery of the hopper. As the shells which are clamped fast are brought around over the guard-plate I they are released by the striking of the outer ends of the clamps against the end of the cam t, and as they are brought under the tube C the blast of air forces them suddenly into the mouth of tube T, down which they slide to the point of delivery. By properly adjusting the cam t the shells may be released, so as to drop upon the guard-plate I a little before they arrive opposite the mouth of tube T, the guard-plate being so adjusted or located as to cause the shells to remain partially within the cell, so as to be moved along on the guard-plate until they are brought over the mouth of the tube T, when they will immediately drop in. As the clamps are carried around below the horizontal plane where there is no groove in the casing, their inner ends will be thrown out into the center of the cells, so as not to interfere with the entrance of such of the shells as are presented mouth foremost, and these shells, lying loose in the cells, will be carried up on the opposite side until they are clamped, as before described, and thus the operation will be continuous.

It is obvious that instead of constructing the clamps n as shown they may be arranged to press against the outside of the shells, in which case it would be necessary to arrange a stationary pin in each cell to prevent the shells from entering with their closed ends foremost; but such an arrangement would unnecessarily complicate the construction by necessitating the use of more parts.

I do not claim the hopper having the internal groove or recess and radial cells, the same being the invention of J. H. Barlow, and described in an application previously filed by him; but it will be observed that in mine the side grooves, e, instead of being radial, are inclined forward in the direction in which the hopper rotates, which serves to guide the shells into the cells.

Having thus described my invention, what I claim is—

1. The rotating annular hopper H, provided with the central annular groove and radial cells o, with the inclined or spiral grooves e arranged opposite the mouths of the cells, as set forth.

2. The annular rotating hopper H, provided with radial cells o and spring-clamps n, in combination with the adjustable cam t and receiving-tube T, the said parts being constructed and arranged to operate substantially as and for the purpose set forth.

3. The combination of the tube T, the annular rotating hopper, provided with internal pockets to receive the shells and deliver them directly into the mouth of the tube, means for holding the shells in the pockets, and the guard-plate extended from the mouth of the tube, as shown.

4. In combination with the rotating hopper H and the receiving-tube T, the blast-tube C, arranged to deliver its blast into or through the cells o of the hopper as they are brought directly over the mouth of the receiving-tube, substantially as shown and described.

MARTIN V. B. HILL.

Witnesses:
DANIEL H. VEADER,
T. L. BURNETT.